(12) United States Patent
Helck

(10) Patent No.: US 8,165,842 B2
(45) Date of Patent: Apr. 24, 2012

(54) MEASURING DEVICE FOR VEHICLE DATA, IN PARTICULAR FOR THE SPEED OF A VEHICLE RUNNING ON WHEELS

(75) Inventor: Christian Helck, Braunschweig (DE)

(73) Assignee: TraJet GmbH (DE)

( * ) Notice: Subject to any disclaimer, the term of this patent is extended or adjusted under 35 U.S.C. 154(b) by 547 days.

(21) Appl. No.: 12/298,202

(22) PCT Filed: Apr. 17, 2007

(86) PCT No.: PCT/EP2007/053727
§ 371 (c)(1),
(2), (4) Date: Jun. 1, 2009

(87) PCT Pub. No.: WO2007/125033
PCT Pub. Date: Nov. 8, 2007

(65) Prior Publication Data
US 2010/0010770 A1     Jan. 14, 2010

(30) Foreign Application Priority Data

Apr. 28, 2006   (DE) .......................... 10 2006 020 471

(51) Int. Cl.
*G01P 3/00*           (2006.01)
(52) U.S. Cl. ......... 702/148; 702/141; 702/142; 702/145
(58) Field of Classification Search .................. 702/141, 702/142, 145, 151, 155, 157; 701/20, 93; 73/488
See application file for complete search history.

(56) References Cited

U.S. PATENT DOCUMENTS

| | | | |
|---|---|---|---|
| 6,466,887 B1 * | 10/2002 | Weinbrenner | 702/141 |
| 7,822,563 B2 * | 10/2010 | Matsuda et al. | 702/41 |
| 2003/0042890 A1 * | 3/2003 | Normann et al. | 324/162 |
| 2004/0083811 A1 * | 5/2004 | Kranz | 73/490 |
| 2004/0094342 A1 * | 5/2004 | Kowatari et al. | 180/65.2 |
| 2004/0225423 A1 | 11/2004 | Carlson et al. | |
| 2006/0108170 A1 * | 5/2006 | Ishikawa et al. | 180/282 |
| 2007/0164853 A1 * | 7/2007 | Matsuda et al. | 340/438 |

FOREIGN PATENT DOCUMENTS

| | | |
|---|---|---|
| DE | 100 37 377 | 2/2002 |
| DE | 10 2005 014 500 | 10/2005 |
| EP | 0 517 082 | 12/1992 |

* cited by examiner

*Primary Examiner* — Eliseo Ramos Feliciano
*Assistant Examiner* — Yaritza H Perez Bermudez
(74) *Attorney, Agent, or Firm* — Salter & Michaelson

(57) ABSTRACT

A measuring device for measuring the speed of a vehicle running on wheels has a first sensor and a second sensor. The two sensors are arranged on the same wheel of a vehicle and rotate with this wheel. Both sensors are arranged in such a way that they measure forces which are each perpendicular to the axis of the wheel and at an angle to one another, and act on the same point. An evaluation device is provided to which the measured values of the two sensors are fed, with the evaluation device obtaining the acceleration of the vehicle in the direction of travel therefrom, and calculating the current vehicle speed from it.

20 Claims, 4 Drawing Sheets

MEASURING DEVICE FOR VEHICLE DATA, IN PARTICULAR FOR THE SPEED OF A VEHICLE RUNNING ON WHEELS

TECHNICAL FIELD

The invention relates to a measuring device for vehicle data, in particular for the speed of a vehicle running on wheels.

BACKGROUND OF THE INVENTION

It is of interest in many cases to know the speed of a vehicle. The vehicle driver needs the speed data to gain some indication of the expected reactions of his vehicle during certain driving maneuvers. It should naturally also be noted that he must adhere to specific speed restrictions. The most precise knowledge possible of the current speed of his own vehicle is also desirable in order to estimate a possible risk during an overtaking action. The speeds of other vehicles or other moving bodies can also be deduced from knowledge of the speed.

The speed of a vehicle, e.g. a motor vehicle on a road, is usually determined from the rotational speed of a vehicle axle. So-called speedometer drives are known, which by mechanical, and more recently electronic, conversion calculate the number of distance units covered, in particular kilometers, as well as the vehicle speed from the rotational speed of the vehicle front axle or of elements connected thereto, and indicate these to the vehicle driver. These measurements are precise within limits and their accuracy of indication is also prescribed to increase road safety.

The conventional methods for measuring vehicle speed generally work from the rotational movement of the vehicle axle. Therefore, they measure the rotational speed of the vehicle axle relative to the vehicle chassis or another non-rotating part of the vehicle. While the measurement is more precise in motor vehicles, there still remain inaccuracies, since the measurement of the rotational speed of the vehicle axle and the subsequent evaluation for display in the motor vehicle must be based on fixed values of the wheel diameter and naturally must disregard any slip between the vehicle axle and the wheel, on the one hand, and between the wheel and the road surface, on the other.

It is proposed for a bicycle in document DE 100 37 377 A1 to clamp electromagnetic or electrostatic or similar sensors to the front wheel of the vehicle itself, so that a corresponding bicycle speedometer can be detached and attached as easily as possible. A calculating counter should also be attached together with the sensor to the spokes of the bicycle. No further details are presented regarding the type of measurement.

A sensor system is evident from document DE 10 2005 014 500 A1, with which vibrations at the wheel are to be detected to determine any anomalies in wheel movement.

Most of the measuring devices used have the disadvantage that they are difficult to mount, because concealed parts of the vehicle have to be accessed. More recently, so-called bus systems are also being used in vehicles to transmit information such as vehicle speed, for example, in the vehicle. Normally no measuring devices may be connected to these for safety-related reasons. Moreover, adaptation is generally necessary for different types of vehicle. In addition, the measuring device must be parameterised and calibrated for each vehicle, since the methods do not supply absolute measured values, but only work with values proportional to speed such as the number of wheel revolutions per minute, for example.

It is also known in principle to obtain the speed from the integration of an acceleration. This method is well suited to deduce the speed $v(t)$ from a known speed $v_0$ according to the following formula:

$$v(t) = v_0 + \int a(t) dt$$

However, in this case the speed $v_0$ must be adjusted again and again, since the advancing integration leads to a drift in the measured value and therefore after only a short period precise values are no longer delivered.

Higher requirements for accuracy are set for a measurement of speed of a vehicle, for example, where measurements in traffic control are concerned. Thus, the speed of a vehicle travelling in front can also be determined from a travelling vehicle travelling behind it, wherein a particularly precise knowledge of one's own speed is necessary to also keep relative measurements usable and conclusive.

This is also problematic because the speed conventionally displayed on the speedometer of the following vehicle must also be picked up or secured in some suitable form to that it can be related to the observed data for the preceding vehicle. Such a pick-up is technically difficult, since there should naturally be no intervention into the safety regions of the following vehicles.

A combination of two gravimetric rotational sensors, which record the accelerations in the vicinity of the rotary axis of vehicle wheels and determine the vehicle speed therefrom, is known from U.S. Pat. No. 6,466,887 B1.

EP 0 517 082 A2 describes a method and a device for tamper-free detection of the wheel speed of vehicles by monitoring the number of revolutions of the wheels. In this case, acceleration magnitudes are determined that correspond to the acceleration due to gravity and/or centrifugal acceleration.

Nevertheless, there remains the desire for more precise possibilities of measuring the speed of vehicles. Moreover, there is the desire to also measure other vehicle data and, for example, determine details about the diameter of a wheel automatically during travel.

Therefore, it is an object of the present invention to propose a measuring device and a method for measuring vehicle data, which in particular allow as precise a measurement as possible of the speed of a vehicle running on wheels and a determination of the diameter of the vehicle wheel during travel.

SUMMARY OF THE INVENTION

This object is achieved by a measuring device for measuring vehicle data, in particular the speed of a vehicle running on wheels, with a first sensor for measuring the acceleration acting on the first sensor, with a second sensor for measuring the acceleration acting on the second sensor, wherein the two sensors are arranged on precisely the same wheel and rotate with this, and wherein the two sensors are arranged so that they measure accelerations, which each act perpendicularly to the axis of the wheel and which are disposed at an angle to one another, with an evaluation device, to which the measured values of the two sensors are fed, wherein the evaluation device is configured and connected so that it determines the acceleration of the wheel in the direction of travel of the vehicle from the measured values of the two sensors and determines the current vehicle speed therefrom, wherein the evaluation device is configured and connected so that from the same measured values it also determines the angular acceleration of the wheel by means of the change of the rotational frequency and the absolute diameter of the wheel is determined by comparing this evaluation with the acceleration of the wheel in the direction of travel.

It is preferred therein that the evaluation device is configured and connected so that the absolute vehicle speed is determined from the thus determined absolute diameter of the wheel and the measured values of the two sensors.

Thus, according to the invention, a precise absolute speed measuring device is provided that does not have to be parameterised and can be easily retrofitted in vehicles.

The object is also achieved by a method for measuring the speed of a vehicle running on wheels, in which there is measured a first acceleration, which, during the movement of the vehicle and the rotation of a wheel acts on a point rotating with the wheel and acts perpendicularly to the axis of the wheel, in which there is measured a second acceleration, which, during the movement of the vehicle and the rotation of a wheel, acts on a point rotating with the wheel and acts perpendicularly to the axis of the wheel and which acts at an angle to the first acceleration, in which the measured values of the two measured accelerations are fed to an evaluation device, in which the measured values are linked to each other and the acceleration of the axis of the wheel of the vehicle in the direction of travel is determined therefrom, in which the current vehicle speed is determined from this determined acceleration, and in which from the same measured values the angular acceleration of the wheel is also determined by means of the change of the rotational frequency and the diameter of the wheel is absolutely determined by comparing this evaluation with the acceleration of the axis of the wheel in the direction of travel.

It is preferred if with this method the absolute vehicle speed is determined from the thus determined diameter of the wheel and the measured values of the two sensors. The invention makes use of an effect seldom used hitherto in this context: besides the acceleration in the direction of travel, which is determined by means of the amplitude of the oscillation signals, the angular velocity is also determined by means of the frequency of the oscillation signals. Thus, two typical characteristics of the measurement signals obtained according to the invention are preferably evaluated.

The invention now transfers the measurement from the vehicle axis to the wheel itself. In this case, two sensors are used that measure the accelerations acting on them during the rotation of the wheel. Besides the vehicle acceleration, this is primarily the downward acting acceleration due to gravity. Therefore, during a rolling motion of the wheel the two sensors would define a sinusoidal course, since they themselves rotate and therefore gravity changes in a sinusoidal manner from its perspective. The vehicle acceleration is superposed on the two sinusoidal oscillations. However, it does not substantially change the sinusoidal course of the signals, which are shifted by one phase as a result of the arrangement of the two sensors.

Namely, two sinusoidal oscillations then result, which supply the two following measured values as a continuous signal:

$$a_x(t) = g\cos(\omega t) - a\sin(\omega t)$$

$$a_y(t) = g\sin(\omega t) + a\cos(\omega t)$$

If these two formulae or signals are now squared and the equations thus obtained are added, then all oscillation-dependent components are cleared and the following formula results:

$$a_x^2 + a_y^2 = g^2 + a^2$$

Since the magnitude of the acceleration due to gravity g is known, the acceleration of the wheel in the direction of travel can be determined from the measured values or signals of the two sensors at any desired time point.

The measured values of the acceleration sensors are calibrated by means of the acceleration due to gravity. Namely, if the vehicle acceleration is $a=0$, then the measured value for g can be determined by means of the amplitude of the oscillations for the two sensors and thus calibrated. The fact that the speed is $v_0$=const. is be determined by there not being a change in the period length T of the oscillation.

Therefore, at its angular velocity $\omega$ the period length T of an oscillation would behave as $T=1/\omega$. The average progressive motion speed of the wheel at $v=2\pi R\omega$ automatically results from this, wherein R is the radius of the wheel.

To now also enable R to be determined, the following method is used in the preferred embodiments. There applies $$V = 2\pi R\omega$$

If this formula is discretely derived according to time, i.e. the change during a wheel revolution in a time period T is considered, then the following is obtained:

$$\Delta V = \overline{a}T = 2\pi R\Delta\omega$$

When converted, the following results:

$$R = \frac{\overline{a}T}{2\pi\Delta\omega}$$

$\Delta\omega$ can be calculated for a revolution directly from the increase or also decrease of the period length T by $\Delta t$, then the following applies:

$$\Delta\omega = \frac{1}{\Delta t}$$

Thus, the radius results as:

$$R = \frac{\overline{a}T\Delta t}{2\pi}$$

The radius can thus be determined from the length of the period, the change in period length during a period and the mean value of the acceleration during a period. All these magnitudes are known as absolute values, with which the absolute radius can be determined and thus then naturally also the vehicle speed. If measurement is conducted with two sensors, then four zero crossings per wheel revolution are available, therefore the changes during a quarter wheel revolution can also be worked with. This method and the formulae do not change. Only the values are used that result from a quarter wheel revolution and the time resolution of the measurement is thus increased.

Therefore, to determine the radius, the change of oscillation frequency is brought into relation with the mean value of the acceleration in the direction of travel and the wheel diameter is determined therefrom. If it is assumed that the wheel diameter cannot change abruptly, the radius can be determined frequently in order to increase accuracy and to check the plausibility of the measurement.

When the radius has been determined in this way, the speed can be determined four times per revolution as mean value by means of the formula $$V = \frac{2\pi R}{T}$$

In this case, the speed can also be calculated by integration working from the thus determined value with the assistance of the acceleration. Because of the drift behaviour of integrators, a calculation of the speed only by integration leads to measurements that are no longer valid after a short time. The evaluation of the frequency for determination of the speed in this respect delivers support points $v_0$, which deliver speeds over ground at any desired time point according to the following formula.

$$v(t) = v_0 + \int a(t)dt$$

It is particularly advantageous that this measurement can occur independently of and additionally to the conventional speed measurement in the vehicle. It is also possible to use these data without any intervention at all in the safety-related regions of the vehicle. The measurement of the acceleration a of the vehicle or the determination of this value from the measured values and signals of the two sensors can either still occur at the wheel with the two sensors in a corresponding evaluation unit or also in an evaluation unit, for instance, in the region of the interior of the vehicle, wherein other measured values can also be fed to the evaluation unit.

Filters that filter the measured values of the two sensors and thus eliminate undesirable interference signals are also preferably provided. These signals can arise as a result of wheel vibrations, for example.

The measured values are digitised for further processing and fed to a microcontroller. The filtering of the signals can either occur on the analog side or on the digitalised side of processing.

Still further possibilities are also created with the invention that could not have been brought into consideration hitherto. Thus, the evaluation unit or the microcontroller can also determine the tire diameter again and again in the described manner, and compare this with a theoretical value and determine comparatively simple deviations herefrom that can be attributable, for example to inadequate tire pressure or also lead to the conclusion that wear of the tire has reached a specific state. In this way, a warning from the measured values can additionally be output to the vehicle driver in a very simple manner.

Moreover, the system is advantageously self-calibrating. Namely, the value of the acceleration due to gravity g then also serves as calibration magnitude for the system in addition to a constant time base. Calibration then occurs if the acceleration is a=0, since then only the acceleration due to gravity g is acting on the two sensors. The determined absolute speed signal can then be used accordingly for calibration.

The two sensors are preferably operated by an integrated power supply.

The sensor can also be used as slip sensor by the ratio of angular acceleration and wheel acceleration a being compared on the basis of current values for R determined previously in the described manner. If there are deviations here in the known R, these are attributable to slip, and therefore absolute slip can also be determined in the previous calibration. Determination of the absolute vehicle speed over ground is likewise possible by this means.

The measuring device can also be used to extend a GPS system for determination of the position of the vehicle. For example, if GPS reception is limited, it is still possible to determine the position from the determination of the absolute vehicle speed.

The sensor can also be used as distance sensor, in which the distance covered is determined by means of the known wheel circumference and the measured number of revolutions from a specific time point.

Since the measuring device also measures the acceleration a, it also records each instance of very heavy braking. This can be used, for example, in combination with a video system as actuator for a video recording in preferred embodiments. Alternatively or additional hereto, in the event of an accident possibilities are thus also created for accident detection in an accident data memory. A memory, in which measured values are held, is additionally provided for this purpose. The last current values could be stored in each case in order to then take these from the sensor after the accident.

The power supply can consist of a battery, for example. However, a storage battery is also conceivable that is charged by the wheel movement by means of a mechanism. The storage battery can also be maintained in charged state by a solar cell. However, it would also be conceivable to supply power by means of induction from outside.

A power-saving mode for the sensors of the measuring device would also be possible. These would only conduct the continuous measurement when the speed lies above a defined limit value.

Moreover, by means of plausibility tests the sensor can also determine itself whether it is correct, i.e. preferably be mounted centrally on the wheel. It can also log this in order to retain any measurements conducted for subsequent verification.

The central arrangement of the two sensors of the measuring device on the wheel allows a particularly simple evaluation of the signals, as may also be seen from the above formulae. However, it is also conceivable in principle to fasten the sensor at a distance outside the centre of the wheel, should this be of advantage for structural or other reasons. However, the calculation of the absolute speed and the preceding values then becomes more complicated. The acceleration effected by the centrifugal force must then be additionally taken into consideration in such calculations.

A measuring device with more than two acceleration sensors is also conceivable. This would increase the resolution of the angular velocity and the individual data and thus improve the accuracy of the entire measuring device. Naturally, the evaluation would become more complicated as a result of this.

The measured values of the signals of the sensors can be transmitted in a wide variety of ways from the wheel to the vehicle or also to a fixed receiver, for example, possibly by wireless transmission, light induction or, if necessary, also connected by wires, for instance by means of sliding contacts.

The data can be transmitted by means of a protocol, in this case the two sensors can be authenticated so that they cannot be subsequently replaced in a measurement system. The protocol handling can also be bidirectional so that the two sensors are controlled from the outside. A plurality of sensors can also be operated in parallel in the same radio network and be uniquely addressed.

DESCRIPTION OF THE DRAWINGS

An exemplary embodiment of the invention is described in more detail below on the basis of the drawings.

DETAILED DESCRIPTION

Figure 1:
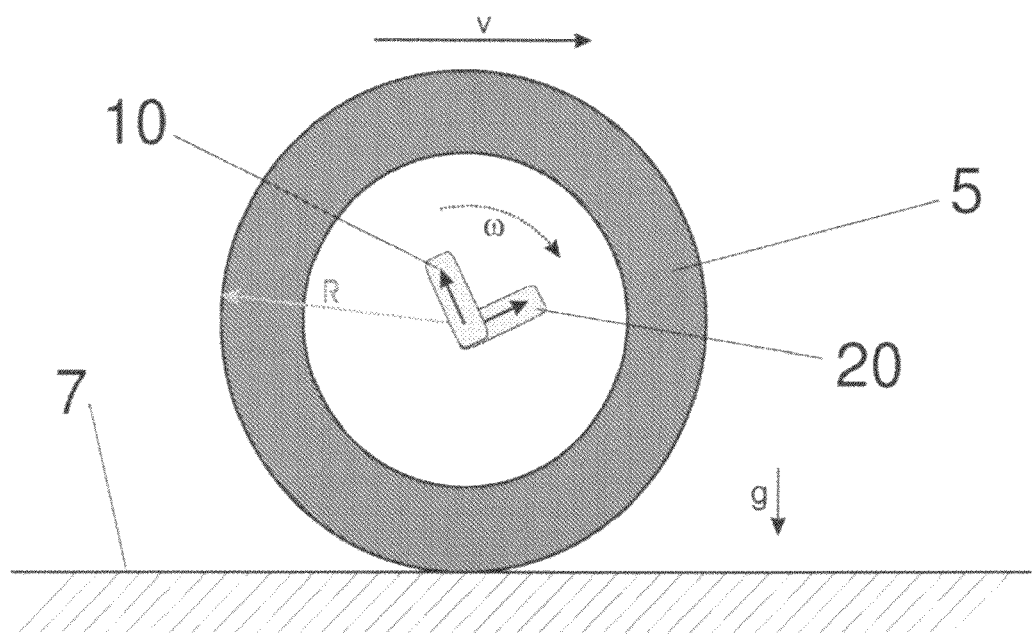
FIG. 1 is a schematic view of a wheel of a vehicle with a part of the arrangement according to the invention.

The measuring device according to the invention is described on the basis of an example, in which a wheel 5 of a vehicle (not otherwise shown) runs on a running surface 7.

The wheel 5 has a radius R. It rotates around the axis oriented perpendicular to the plane of the drawing at an angular velocity ω to the right in the shown example. As a result, the axis of the wheel 5 and therefore the vehicle (not shown) also move to the right at a speed v.

The vehicle including the wheel 5 is held on the running surface 7 by gravity. The acceleration due to gravity g that acts downwards perpendicularly to the running surface 7 is indicated.

Two sensors 10 and 20 are located in the centre of the wheel 5. Each of the two sensors 10 and 20 is an acceleration sensor and measures the acceleration acting on it in a specific direction. Since the two sensors 10 and 20 rotate with the wheel 5, they sense the acceleration due to gravity as sinusoidal oscillation when the rotation of the wheel 5 occurs at a specific speed v.

Figure 2:
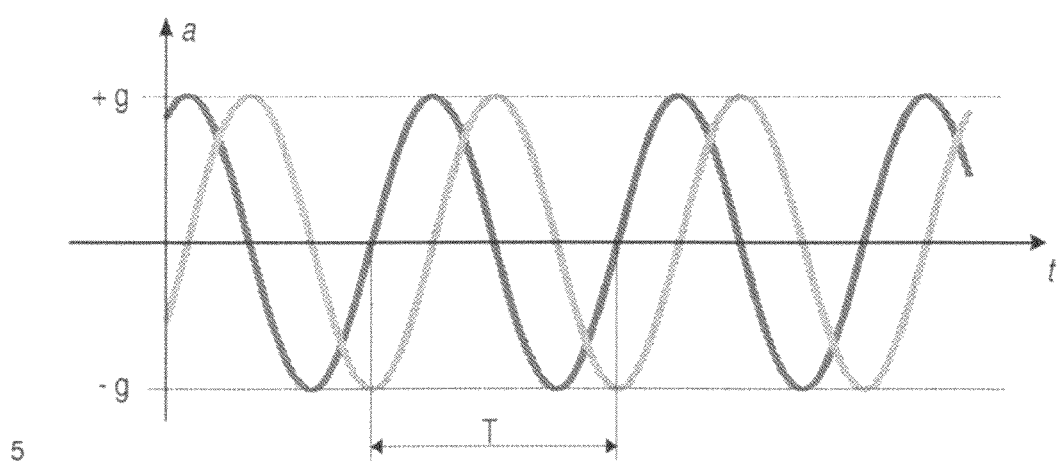
FIG. 2 shows a signal course, which is recorded with the device according to the invention, at constant vehicle speed V.

This signal course is shown in FIG. 2. Therein, the measured values of the two sensors are plotted upwards, while the time t is plotted to the right.

The two oscillations, which are identical, but in the shown example are offset by 90° or π/2, and run between +g and −g, are shown.

Therein, the relation of the period length T to the angular velocity ω is T=1/ω. Therefore, the speed of the wheel is v=2πRω. The acceleration a in the direction of travel can also be calculated in similar form from the angular acceleration, but would then be dependent on the radius R of the wheel 5.

However, as already specified above, in the case of a non-constant angular velocity ω the following would apply for the measured values of the two individual sensors:

$$a_x(t)=g\cos(\omega t)-a\sin(\omega t)$$

$$a_y(t)=g\sin(\omega t)+a\cos(\omega t)$$

If the two formulae were squared and added, then all the oscillation-dependent components would be cleared and the acceleration in the direction of travel would directly result without any dependence on the radius R of the wheel 5 or angular velocity ω:

$$a_x^2+a_y^2=g^2+a^2$$

Figure 3:
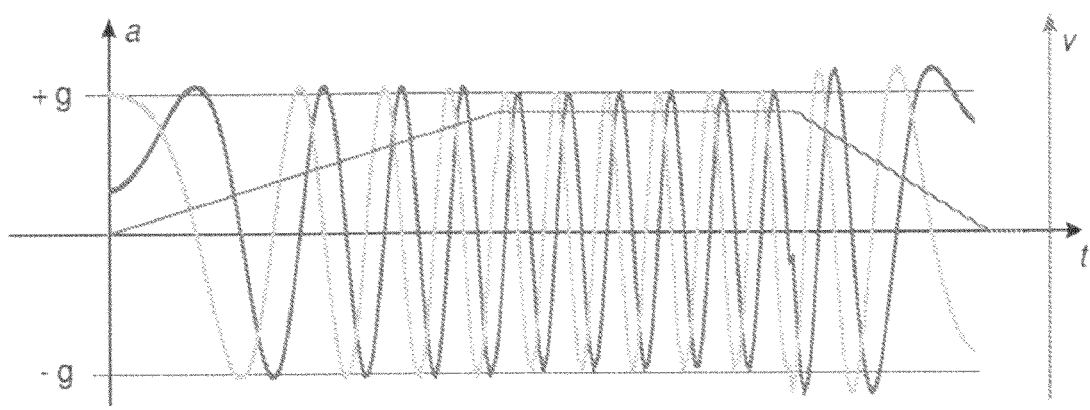
FIG. 3 shows a further signal course, which occurs with a change of speed of the vehicle.

In the case of a change of speed, the shown course of the sensor signals results in principle, as shown in FIG. 3, wherein a similar representation is selected as in FIG. 2.

Figure 4:
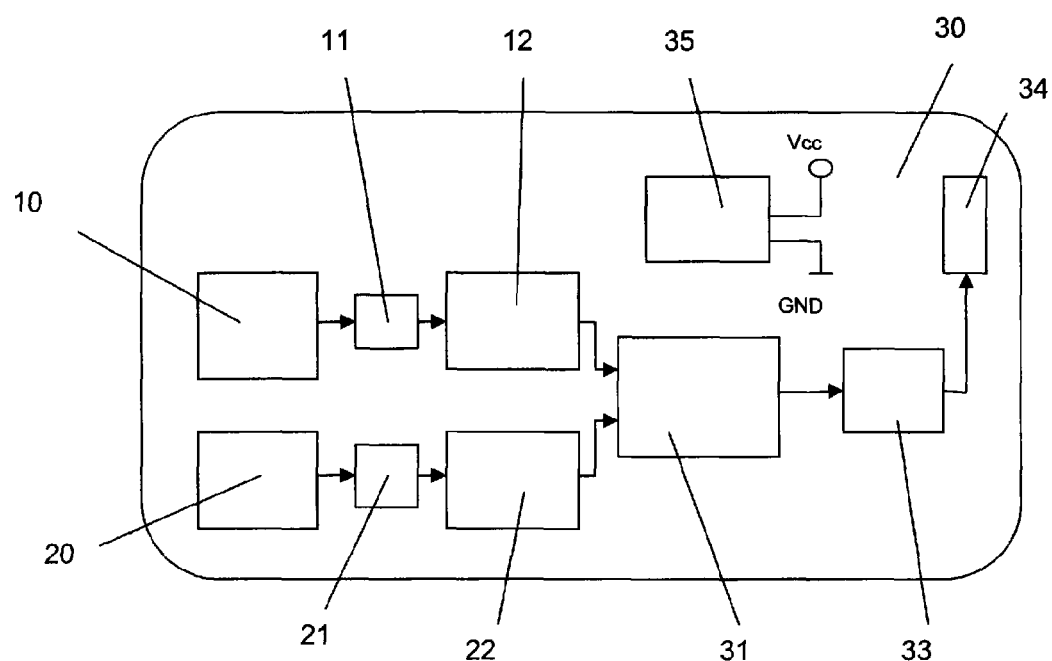
FIG. 4 is a schematic representation of an arrangement according to the invention.

A practical structure of a measuring device according to the invention is shown in FIG. 4. It is represented purely schematically and shows that the measured values of the sensors 10 and 20 are each passed to a filter 11 and 21 respectively, from which they are each directed as filtered measured values to an analog-to-digital converter 12 and 22 respectively.

The outputs of the two converters 12 and 22 are directed to a microcontroller 31 in an evaluation unit 30. This also takes a time base (f=constant) into consideration. It is also shown schematically that the data are then transmitted to an antenna 34 via a radio interface 33. This is an embodiment that also provides the evaluation unit 30 on the wheel 5.

A power supply 35 is also provided.

Figure 5:
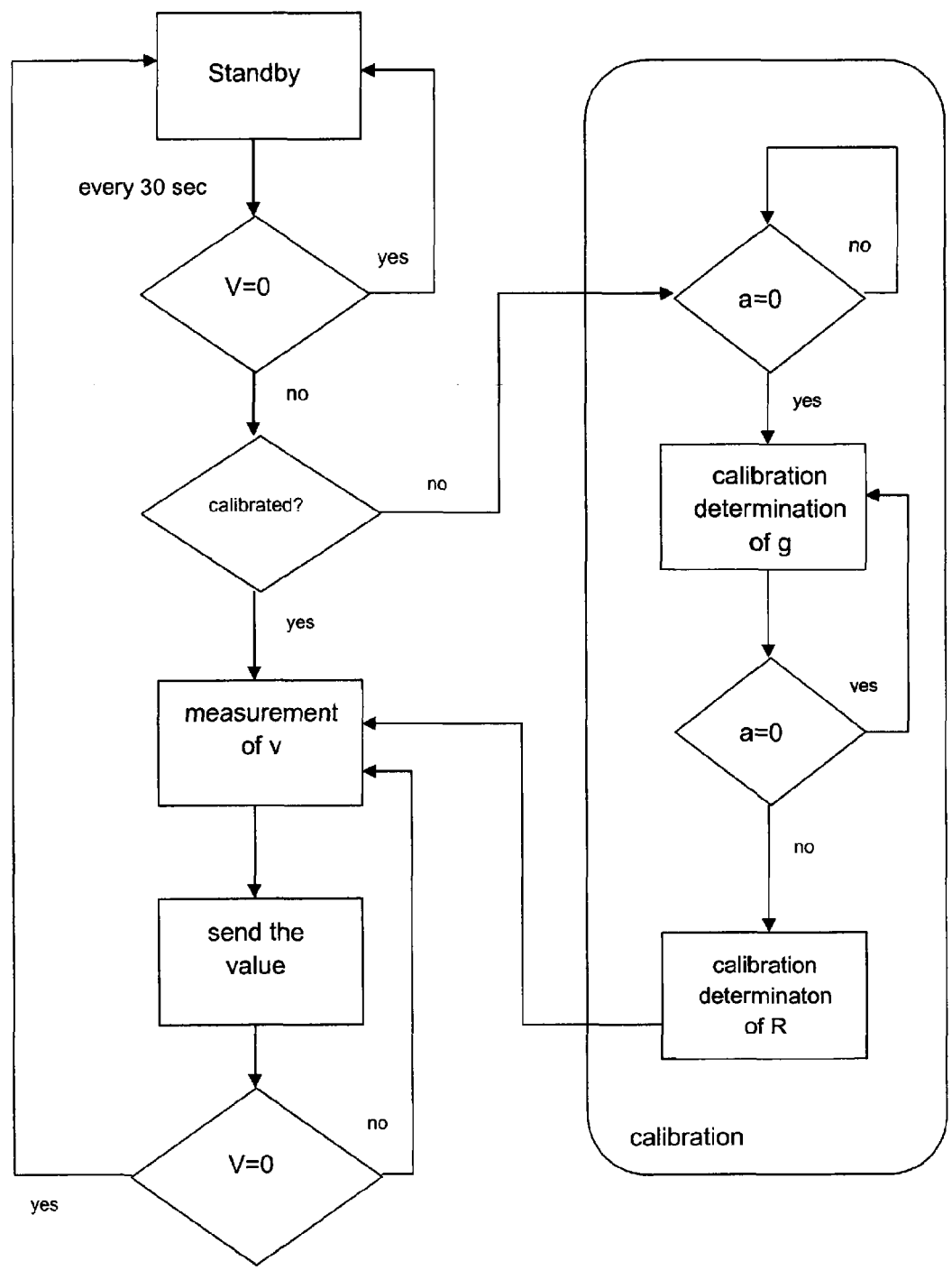
FIG. 5 is a chart showing the sequence of an evaluation and self-calibration.

FIG. 5 schematically shows the possible sequence of an evaluation. In this case, the procedure during a possible calibration is also taken into consideration.

Symbols Used a vehicle acceleration
ā mean value of the vehicle acceleration over a discrete time period
$a_x$ acceleration signal of the first sensor
$a_y$ acceleration signal of the second sensor
g acceleration due to gravity
V vehicle speed
R wheel diameter
T period length of the measured sinusoidal oscillation
Δt time difference between two consecutive period lengths
ω angular velocity
Δω change of angular velocity in a discrete time period
ΔV change of vehicle speed in a discrete time period
v(t) variable vehicle speed at time point t
$v_0$ current speed
t time List of Reference Numerals

5 wheel
7 running surface
10 sensor
11 filter
12 converter
20 sensor
31 filter
22 converter
30 evaluation unit
31 microcontroller
33 radio interface
34 antenna
35 power supply

The invention claimed is:

1. A measuring device for measuring the speed of a vehicle running on wheels comprising,
   a) a first sensor for measuring the acceleration acting on the first sensor to provide a first sensor measured value,
   b) a second sensor for measuring the acceleration acting on the second sensor to provide a second sensor measured value,
   c) wherein the two sensors are arranged on the same wheel and rotate therewith,
   d) wherein the two sensors are arranged so that they measure accelerations, which each act perpendicularly to the axis of the wheel and which are disposed at an angle to one another,
   e) an evaluation device, to which the measured values of the two sensors are fed,
   f) wherein the evaluation device is constructed and arranged so that the evaluation device determines the acceleration of the wheel in the direction of travel of the vehicle from the measured values of the two sensors and determines the current vehicle speed therefrom, and independent of a measurement of wheel diameter,
   g) wherein the evaluation device is constructed and arranged so that from the measured values of the two sensors, the evaluation device also determines the angular acceleration of the wheel by means of the change of the rotational frequency and the diameter of the wheel is absolutely determined by comparing the angular acceleration with the acceleration of the wheel in the direction of travel.

2. A measuring device according to claim 1, characterised in that the evaluation device is configured and connected so that the vehicle speed is determined from the thus determined diameter of the wheel and the measured values of the two sensors.

3. A measuring device according to claim 1, characterised in that the two sensors each measure accelerations, which act on the same point.

4. A measuring device according to claim 1, characterised in that the two sensors each measure accelerations, which act perpendicularly to one another.

5. A measuring device according to claim 1, characterised in that the two sensors are arranged in the centre of the wheel.

6. Method for measuring the speed of a vehicle running on wheels, comprising:
   a) during the movement of the vehicle and the rotation of a wheel, a first acceleration is measured, which acts on a point rotating with the wheel and perpendicularly to the axis of the wheel,
   b) during the movement of the vehicle and the rotation of a wheel, a second acceleration is measured, which acts on a point rotating with the wheel and perpendicularly to the axis of the wheel and which acts at an angle to the first acceleration,
   c) the measured values of the two measured accelerations are fed to an evaluation device,
   d) the measured values are linked to each other and the acceleration of the axis of the wheel of the vehicle in the direction of travel is determined therefrom,
   e) the current vehicle speed is determined from this determined acceleration, and independent of a measurement of wheel diameter, and
   f) from the same measured values the angular acceleration of the wheel is also determined by means of the change of the rotational frequency and the diameter of the wheel is absolutely determined by comparing the angular acceleration with the acceleration of the axis of the wheel in the direction of travel.

7. Method according to claim 6, characterised in that the vehicle speed is determined from the thus determined diameter of the wheel and the measured values of the two sensors.

8. Method according to claim 6, characterised in that the second measurement is conducted perpendicularly to the first measurement.

9. Method according to claim 6, characterised in that the two measurements are conducted at a point in the centre of the wheel.

10. Method according to claim 9, characterised in that the measured values are squared and added, and that the result is compared with the square of the acceleration due to gravity.

11. Method according to claim 6, characterised in that the measured values are filtered with respect to interference signals.

12. Method according to claim 8, characterised in that in a further step the measured values are compared with a speed value determined by a different method or a different determined speed value and a current value of the diameter of the wheel is determined therefrom.

13. Method according to claim 12, characterised in that the determined value of the diameter of the wheel is compared with comparative values and/or previously determined values and the wear and/or tire pressure is deduced therefrom.

14. Method according to claim 6, characterised in that the measured values are supplemented with a value for the diameter of the wheel determined by a slip of the wheel relative to the running surface.

15. Method according to claim 6, characterised in that the values determined by means of the evaluation device are in combination with a video device for video recording.

16. A measuring device for measuring the speed of a vehicle running on wheels comprising,
   a) a first sensor for measuring the acceleration acting on the first sensor to provide a first sensor measured value,
   b) a second sensor for measuring the acceleration acting on the second sensor to provide a second sensor measured value,
   c) wherein the two sensors are arranged on the same wheel and rotate therewith,
   d) wherein the two sensors are arranged so that they measure accelerations, which each act perpendicularly to the axis of the wheel and which are disposed at an angle to one another, and
   e) an evaluation device, to which the measured values of the two sensors are fed,
   f) wherein the evaluation device is constructed and arranged so that the evaluation device determines the acceleration of the wheel in the direction of travel of the vehicle from the measured values of the two sensors and determines the current vehicle speed therefrom,
   g) wherein the evaluation device is constructed and arranged so that from the measured values of the two sensors the evaluation device also determines the angular acceleration of the wheel by means of the change of the rotational frequency;
   h) and wherein the evaluation device is further constructed and arranged so that, from the measured values of the first and second sensors, the measured values are combined in a manner so that the calculation of acceleration in the direction of travel of the vehicle and determination of vehicle speed is independent of the radius of the wheel.

17. A measuring device according to claim 16, characterised in that the first and second sensor values are combined by squaring and adding these values.

18. A measuring device according to claim 17, characterised in that the measured values of the two individual sensors are:

$$a_x(t) = g \cos(\omega t) - a \sin(\omega t)$$

$$a_y(t) = g \sin(\omega t) + a \cos(\omega t)$$

19. A measuring device according to claim 18, characterised in that when the two formulae were squared and added, then all the oscillation-dependent components are cleared and the acceleration in the direction of travel directly results without any dependence on the radius R of the wheel or angular velocity $\omega$:

$$a_x^2 + a_y^2 = g^2 + a^2$$

20. A measuring device according to claim 16 characterised in that the diameter of the wheel is determined by comparing the angular acceleration with the acceleration of the wheel in the direction of travel.

* * * * *